United States Patent [19]

Jones, Jr.

[11] 4,456,112
[45] Jun. 26, 1984

[54] OVERLOAD CONTROL FOR MECHANICAL POWER PRESSES

[75] Inventor: Clarence O. Jones, Jr., Eggertsville, N.Y.

[73] Assignee: Niagara Machine & Tool Works, Buffalo, N.Y.

[21] Appl. No.: 301,881

[22] Filed: Sep. 14, 1981

[51] Int. Cl.³ .............................................. F16P 5/00
[52] U.S. Cl. ...................................... 192/150; 100/53
[58] Field of Search ......................... 192/150; 100/53; 307/118

[56] References Cited

U.S. PATENT DOCUMENTS

| | | | |
|---|---|---|---|
| 1,808,606 | 6/1931 | Pels | 74/584 |
| 2,438,951 | 4/1968 | Stevens | 164/86 |
| 3,407,913 | 10/1968 | Tezuka | 192/150 |
| 3,931,560 | 1/1976 | Willson | 307/118 |
| 4,030,336 | 6/1977 | Grigorenko et al. | 100/53 |
| 4,161,660 | 7/1979 | Gallant | 307/118 |
| 4,164,644 | 8/1979 | Kasiwicz | 307/118 |
| 4,289,066 | 9/1981 | Proga | 100/53 |

FOREIGN PATENT DOCUMENTS 653142  3/1979  U.S.S.R. ............................ 100/53

Primary Examiner—Rodney H. Bonck
Assistant Examiner—James J. Merek
Attorney, Agent, or Firm—Christel, Bean & Linihan

[57] ABSTRACT

An overload control for a mechanical press wherein excess hydraulic pressure generated by the mechanical overload of the press is applied to a transducer which develops an electrical signal which in turn is applied to a circuit which is responsive to the magnitude of the electrical signal and to the time increment during which the magnitude of the electrical signal is developed and applied to the circuit. The circuit includes a timing and reference portion comprising a voltage divider network and an RC network, and the circuit also includes a differential amplifier responsive to a difference in magnitude between the transducer signal and a signal from the timing and reference portion. As a result, when the instantaneous signal from the transducer increases suddenly due to an actual overload on the press, the circuit responds and operates a relay to cause stoppage of the press. On the other hand, the circuit does not respond to a relatively slower change in the transducer signal resulting from a slow change in pressure during non-overload conditions.

9 Claims, 2 Drawing Figures

OVERLOAD CONTROL FOR MECHANICAL POWER PRESSES

BACKGROUND OF THE INVENTION

This invention relates to mechanical power presses for stamping sheet material and the like and more particularly to the type of power press known in the art as a mechanical press wherein the frame of the press has a base portion for receiving sheet metal stamping or forming dies and the crown of the press has eccentric or crankshaft means for driving a vertically reciprocal slide toward and away from the bed of the press to effect pressing strokes. The slide is supported and guided for such reciprocation by the frame of the press.

In the prior art a number of patents show means for stopping operation of a mechanical punch press when the load exceeds a given limit to prevent undesired overload of the press. A common method of accomplishing this purpose is by interposing hydraulic fluid between the mechanical drive means and the reciprocating slide of the press, for instance as shown in Pels U.S. Pat. No. 1,808,606 and Stevens U.S. Pat. No. 2,438,951, and by providing means to shut down the press when a predetermined hydraulic pressure force is exceeded. In fact, this is the usual method of terminating press operation in mechanical presses when overload occurs.

In some of these prior patents the excess hydraulic pressure generated by the mechanical overload of the press is applied to a transducer which develops an electrical signal which terminates press operation.

It would be highly desirable to provide a press overload control of the type wherein excess hydraulic pressure generated by the mechanical overload of the press is utilized by the control and wherein the control can distinguish an actual press overload condition from a mere increase in hydraulic pressure caused by non-overload conditions, such as during setting of the hydraulic arrangement.

SUMMARY OF THE INVENTION

The principal object of this invention is to provide a mechanical press with an hydraulic arrangement which provides an overload safety control which distinguishes actual press overload conditions from mere increases in hydraulic pressure caused by non-overload conditions.

The present invention provides an overload control for a mechanical press wherein excess hydraulic pressure generated by the mechanical overload of the press is applied to a transducer which develops an electrical signal which in turn is applied to a circuit which is responsive to the magnitude of the electrical signal and to the time increment during which the magnitude of the electrical signal is developed and applied to the circuit. As a result, when the instantaneous signal from the transducer increases suddenly due to an actual overload on the press, the circuit responds and causes the press to stop. On the other hand, the circuit does not respond to a relatively slower change in the signal resulting from a slow change in pressure during non-overload conditions such as setting up the hydraulic system.

While a single specific embodiment of the principles of the present invention is illustrated in the accompanying drawing and described in detail in the following specification, it is to be understood that such embodiment is by way of example only and that various mechanical modifications may be made without departing from the spirit of the invention, the scope of which is defined in the appended claims.

DETAILED DESCRIPTION OF THE ILLUSTRATED EMBODIMENT

Figure 1:
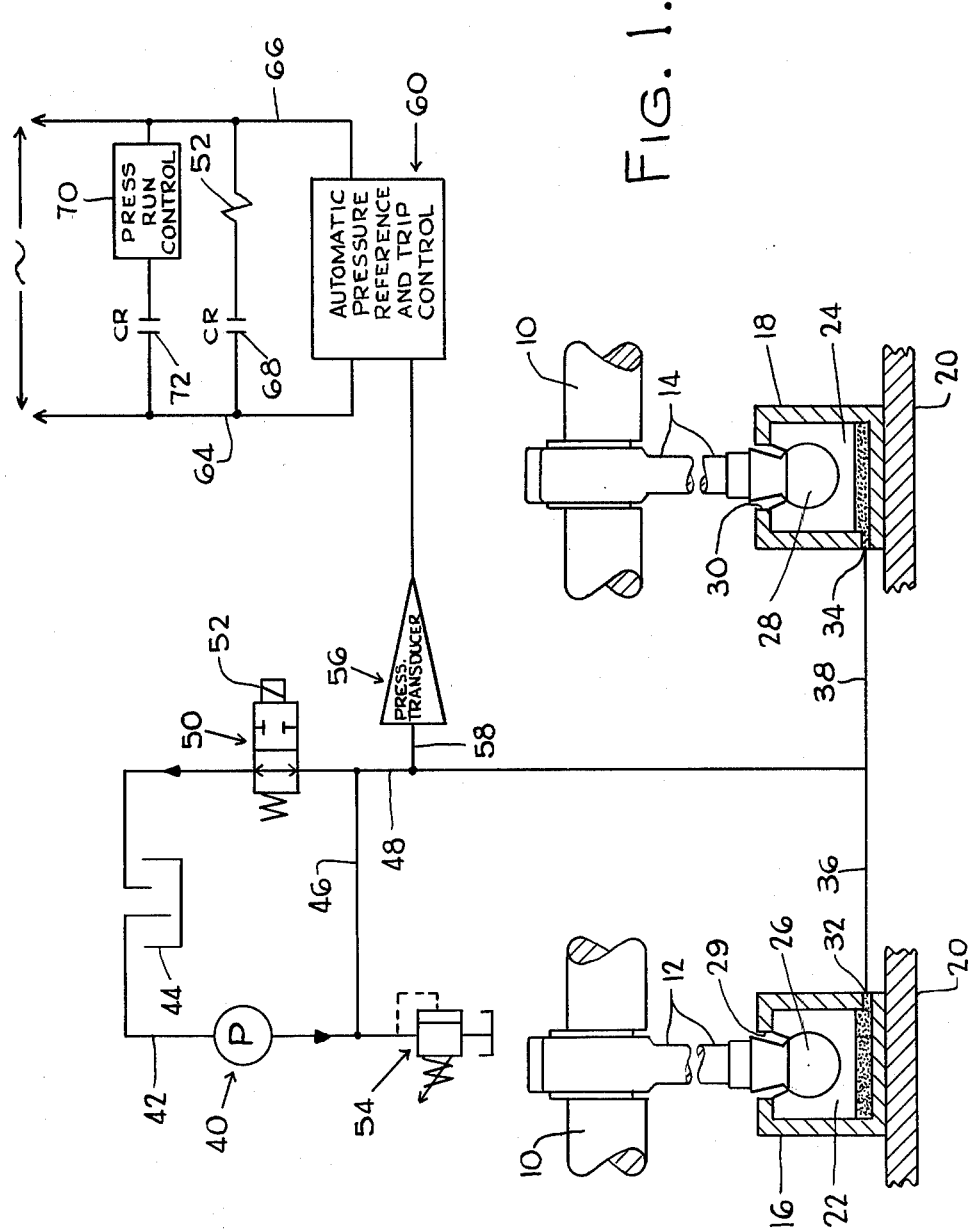
FIG. 1 is a partial front elevational view of the drive portion of a double crank press with the hydraulic and electrical portions of the overload control of the present invention being shown schematically.

FIG. 1 of the drawing shows schematically a power press driven mechanically by a conventional eccentric shaft 10 and a pair of connections or rods 12,14 each received at the lower end thereof in corresponding barrels 16 and 18, respectively. The barrels 16,18 are fixed to the press slide 20 which, in turn, is guided for vertical movement in the framework of the press for movement toward and away from the usual press bed which is fixed to the press framework.

Various arrangements can be employed for providing a driving connection between the lower ends of rods 12,14 and corresponding barrels 16,18 fixed to slide 20. In the present illustration, briefly, each barrel 16 and 18 contains a block 22 and 24, respectively, and each block 22,24 fits relatively closely within the corresponding barrel 16,18 and is of a size permitting a limited degree of movement within the barrel in a direction toward and away from slide in a manner which will be described. Each block 22,24 is fitted with a ball joint coupling element 26,28 pivotally received in a ball-shaped recess in the block and having a connecting end extending through a corresponding opening 29,30 in barrels 16,18. The couplings 26 and 28, in turn, are fixed to the lower ends of rods 12 and 14, respectively. Each of the blocks 22,24 is of a size which defines a space or region between the end face thereof and the end wall of the respective barrel adjacent slide 20 for containing pressurized fluid, in particular hydraulic fluid. Each barrel 16,18 is provided with an opening 32,34 communicating with the fluid-containing region, and the openings 32 and 34 are connected to lines 36 and 38, respectively, of a fluid or hydraulic circuit which will be described in detail presently.

The foregoing arrangement thus provides fluid or hydraulic cylinders operatively associated with the press slide 20 to provide fluid or hydraulic pressure proportional to the pressing force. In particular, the barrels 16,18 are the cylinders, the blocks 22,24 are the pistons and the connecting rods 12,14 are the piston rods.

In the interest of simplicity the drawing shows only the portions of the press mechanism which are concerned with the present invention, and it is to be understood that the remainder of the press structure is entirely conventional in mechanical double crank presses and the principles of the invention are equally applicable to single crank or other mechanically driven presses. For a more detailed description of an hydraulic arrangement for sensing pressing force to determine an overload condition and correct the same, reference may be made to U.S. patent application Ser. No. 146,651 filed May 5, 1980 entitled "Hydraulic Position Control For Mechanical Power Press Slides", now U.S. Pat. No.

4,289,066 issued Sept. 15, 1981 and assigned to the assignee of the present invention, the disclosure of which is hereby incorporated by reference.

In the arrangement shown, pressure is supplied to the hydraulic cylinders associated with slide 20 by a pump 40 having an input connected by conduit 42 to a reservior 44 containing hydraulic fluid and having an output connected by lines 46 and 48 to the junction of lines 36 and 38 which are connected to the respective cylinders associated with the slide. A solenoid-operated, two-way valve generally designated 50 is connected between the junction of conduits 46,48 and the reservoir 44. When electrical power is applied to the press to turn on the main press motor, a relay becomes energized which energizes the solenoid winding 52 of valve 50 and shifts the valve to a blocking position thereby causing pump 40 to supply hydraulic fluid to the regions within the barrels 16,18 below the blocks 22 and 24 shown in FIG. 1 thereby pressurizing the arrangement. A pressure relief valve 54 is connected to conduit 46.

In accordance with the present invention, there is provided transducer means 56 operatively connected to the hydraulic means for providing an electrical signal having a magnitude proportional to the hydraulic pressure. The transducer 56 converts a change in hydraulic pressure to an electrical signal or impulse of proportional magnitude. In the arrangement shown, the input of transducer 56 is connected by conduit 58 to conduit 48. In accordance with the present invention there is also provided circuit means having an output and having an input connected to transducer 56. Circuit 60 provides an output signal which is a function of the magnitude of the electrical signal from transducer 56 and which also is a function of the time increment during which the magnitude of the electrical signal from transducer 56 is developed and applied to the circuit 60. In particular, the circuit 60 provides an output signal when the output signal from transducer 56 changes by a predetermined minimum amount and at a predetermined minimum time rate of change. As a result, circuit 60 provides an output signal in response to a tonnage overload condition in the press which output signal can be utilized for control purposes, in particular for stopping the press and depressurizing the hydraulic system.

As shown in FIG. 1, the 110 volt, 60 cycle output from the press control transformer (not shown) is applied to lines 64,66 which are connected to circuit 60 for supplying operating voltage thereto in a manner which will be described. A first branch circuit connected across lines 64,66 includes the series combination of solenoid coil 52 of valve 50 and a set of normally open relay contacts 68, the contacts being controlled by a relay (not shown) operated by circuit 60 in a manner which will be described. A second branch circuit includes the series combination of a conventional press control run circuit 70 and another set of normally closed relay contacts 72 which also are controlled by the aforementioned relay of circuit 60. During normal operation of the press, the normally closed contacts 72 supply electrical power to circuit 70 for operation thereof and the normally open contacts 68 place coil 52 in a de-energized condition to maintain the valve 50 in a blocking position to supply hydraulic fluid to the cylinders associated with slide 20. When an overload occurs on the press causing the voltage from transducer 56 to increase suddenly, circuit 60 operates the aforementioned relay to close contacts 68 and to open contacts 72. Closing of contacts 68 completes a circuit to energize coil 52 to switch the position of valve 50 thereby opening line 48 from the cylinders associated with slide 20 to the reservoir 44 and depressurizing the hydraulic overload system. Opening of contacts 72 breaks the supply circuit to the press control and run circuit 70 thereby stopping the press drive motor.

Figure 2:
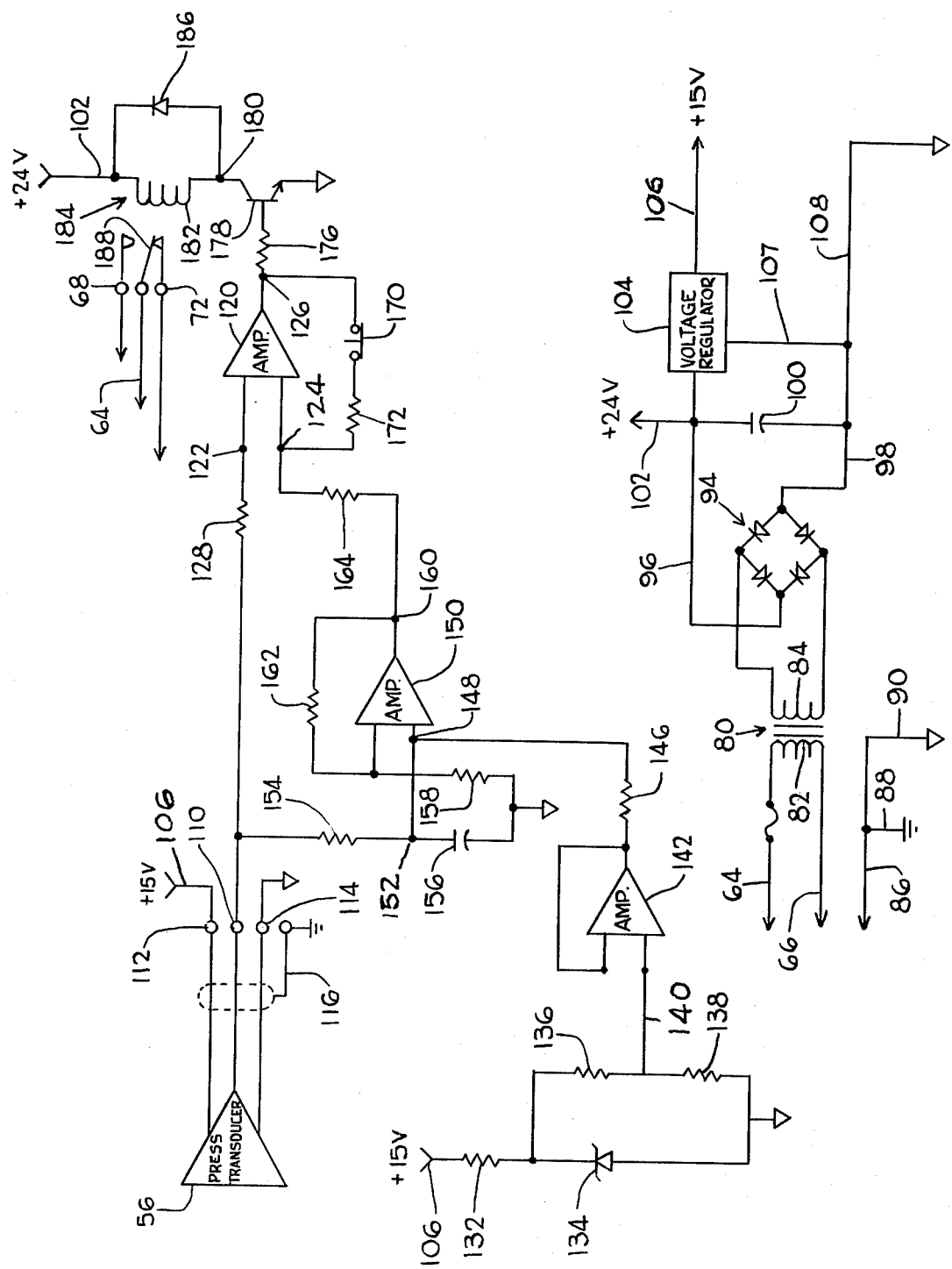
FIG. 2 is a schematic circuit diagram showing the electrical circuit and associated pressure transducer of the overload control of the present invention.

FIG. 2 is a schematic circuit diagram showing the circuit 60 in detail and the connection of transducer 56 thereto. The circuit has a power supply portion including a transformer 80 having primary and secondary windings 82 and 84, respectively, and the primary winding 82 is connected to lines 64,66 shown in FIG. 1 and leading from the press control transformer. A reference line 86 is connected by line 88 to earth ground and by line 90 to the internal or equipment ground. The transformer secondary winding 84 is connected to a full-wave diode bridge rectifier 94 which converts the output of transformer 80 to full-wave rectified voltage having a magnitude of about 24 volts. The output of rectifier 94 is connected by lines 96,98 to a filter capacitor 100. The voltage on line 96 is connected by line 102 to another portion of the circuit 60 in a manner which will be described. The filtered output voltage is connected to the input of a voltage regulator 104 which provides a regulated output voltage of 15 volts on line 106 connected to other portions of the circuit in a manner which will be described. Line 98 and a reference line 107 leading from regulator 104 are connected by line 108 to the internal electrical ground or reference.

By way of example, in an illustrative circuit, transformer 80 is type LP-34-170, capacitor 100 has a magnitude of 1,000 microfarads rated at 35 volts, and regulator 104 is a National Semiconductor type LM 78L.

Pressure transducer 56 has an output terminal 110, a bias terminal 112 which is connected to line 106, and a ground or reference terminal 114 which is connected to the internal ground. The conductor including the electrical leads between transducer 56 and the three terminals is provided with a shield as shown in broken lines and which is connected by line 116 to earth ground.

The circuit 60 as shown in FIG. 2 includes comparison means having a pair of inputs and an output for providing an output signal when the difference between the magnitudes of the signal inputs is greater than a predetermined amount. The comparison means comprises a differential amplifier 120 having first and second inputs 122 and 124, respectively, and an output 126. The one input 122 is connected through a resistor 128 to the transducer output terminal 110. The other input terminal 124 of amplifier 120 is connected to a timing and reference circuit which now will be described.

Line 106 on which the regulated voltage is provided from the power supply portion is connected to one terminal of a resistor 132, the other terminal of which is connected to the cathode of Zener diode 134. The anode of diode 134 is connected to the internal ground. A voltage divider in the form of the series combination of resistors 136 and 138 is connected across diode 134. The junction of resistors 136,138 is connected by line 140 to one input of a differential amplifier 142 connected for unity gain. The output of amplifier 142 is connected by a resistor 146 to one input terminal 148 of a differential amplifier 150 which has a second input terminal designated 152. The output of transducer 156 is coupled through an RC timing network to amplifier 150. In particular, output terminal 110 of transducer 56 is connected to one terminal of a resistor 154, the other terminal of which is connected to one terminal of a capacitor 156. The other terminal of capacitor 156 is connected to the internal ground. The junction of resistor 154 and capacitor 156, which together comprise the RC timing network, is connected to the input terminal 148 of amplifier 150. The other input terminal 152 is connected through a resistor 158 to the internal ground. Amplifier 150 has an output terminal 160 which is connected through a resistor 162 to input terminal 152 for determining the amplifier gain. Output terminal 160 also is connected through a resistor 164 to the input terminal 124 of amplifier 120.

The output terminal 126 of amplifier 120 is connected to the input terminal 124 through the series combination of a manually-operated reset switch 170 and a resistor 172. Output terminal 126 also is connected through a resistor 176 to the control or base terminal of a driver transistor 178. Transistor 178 is of the NPN type and the emitter terminal thereof is connected to the internal ground. The collector terminal 180 of transistor 178 is connected to one terminal of the control winding 182 of a relay generally designated 184. The other terminal of winding 182 is connected to line 102 providing the positive direct voltage from the power supply portion. A diode 186 is connected across winding 182. Coil 182 is operatively associated with a relay switch arm 188 for controlling movement thereof between a pair of switch contacts, i.e. the contacts 68 and 72 of FIG. 1.

In the arrangement shown, the switch arm 188 is electrically connected to one of the lines of the power supply circuit of FIG. 1, in the present example line 64. The relay is shown with arm 188 engaging the normally closed contact 7Z which is in series with the press control run circuit 70. In other words, in the mode of operation shown, when coil 182 is not energized, switch arm 188 engages contact 72 to complete the circuit to the press control run circuit. The other switch contact 68 is normally open thereby de-energizing valve winding 52 and maintaining valve 50 in the blocking position to pressurize the hydraulic cylinders as described in connection with the arrangement of FIG. 1. In response to an overload condition sensed by transducer 56 in cooperation with circuit 60, energization of winding 182 switches arm 188 into engagement with the contact 68 and out of engagement with contact 72. As a result, the circuit to the valve solenoid 52 is closed and the circuit to the press run circuit 70 is opened thereby depressurizing the hydraulic system and stopping the press drive motor.

The circuit of FIG. 2 operates in the following manner. The primary winding 82 of transformer 80 receives the 110 volt, 60 cycle alternating current output from the press control transformer (not shown) over lines 64,66, and transformer 80 and rectifier 94 convert this to full wave rectified direct voltage having a magnitude of 24 volts. This, in turn, is filtered by capacitor 100 and regulated by regulator 104 to 15 volts d.c. on line 106. The regulated 15 volts d.c. is applied to resistor 132 and Zener diode 134, and the Zener voltage is supplied to the voltage divider comprising resistors 136,138. These resistors determine the magnitude of the voltage on line 140 applied to the input of amplifier 142 and, accordingly, determine the magnitude of the reference voltage applied to input terminal 148 of amplifier 150. The magnitude of resistor 136 is selected according to the reference voltage magnitude desired at input 148 of amplifier 150. The magnitude of this reference voltage determines the amount by which the system hydraulic pressure must increase in order to cause circuit 80 to energize relay 184.

Transducer 56 is supplied with operating voltage by line 106 and provides an output voltage signal on terminal 110 which is proportional to the pressure of the hydraulic system, i.e. to the pressure of the hydraulic fluid in cylinders 16,18 shown in FIG. 1. This voltage signal is applied to input terminal 122 of amplifier 120 and to the RC network comprising resistor 154 and capacitor 156. After a time period determined by the time constant of the RC network, the voltage signal from pressure transducer 56 and the reference signal from amplifier 142 are applied to input terminal 148 of amplifier 150. The output of amplifier 150 on terminal 160 is greater in magnitude than the output of pressure transducer 56 by an amount determined by the magnitude of resistor 136.

As previously described, the instantaneous voltage from pressure transducer 56 is applied to input terminal 122 of amplifier 120 and the voltage from amplifier 150 is applied to the other input terminal 124 of amplifier 120. When the instantaneous voltage from pressure transducer 56 increases suddenly due to an overload on the press, the voltage on input terminal 122 exceeds the voltage on the input terminal 124 by an amount sufficient to result in an output signal from amplifier 120, taking into account the magnitude of the reference voltage on input terminal 124 obtained from voltage divider 136,138, which operates relay 184 to close relay contacts 68 thereby operating valve 50 to depressurize the hydraulic system and to open relay contacts 72 thereby disconnecting press control run circuit 70 to stop the press drive motor. On the other hand, a slow change in the pressure of the hydraulic system, such as that which occurs during setting of the hydraulic system, does not cause the signal on amplifier input terminal 122 to exceed the signal on input terminal 124 by an amount sufficient to result in an output signal from amplifier 120. This is because during such a slow change in pressure and corresponding slow change in the signal from transducer 56, there is sufficient time for the RC network to respond thereby applying a signal to amplifier input terminal 124 of a magnitude substantially equal to that of the signal on input terminal 122. As a result, slow changes in pressure resulting from non-overload conditions do not cause operation of relay 184.

By way of example, in an illustrative circuit, pressure transducer 56 is commercially available from National Semiconductor under the designation LX 1470A, resistor 132 has a magnitude of 8.2 kilohms, Zener diode is type LM 329DZ, resistor 136 has a magnitude of 3.74 kilohms, each of the resistors 138,154 and 158 has a magnitude of 100 kilohms, capacitor 156 has a magnitude of 220 microfarads rated at 15 volts, transistor 178 is type 92 PU05 and relay 184 is of the type commercially available under the designation Allied T163C-C. In the foregoing illustrative circuit, a change in hydraulic pressure causing a change in magnitude of the output of transducer 56 of one volt in two seconds will operate relay 184 to cause stopping of the press and depressurizing of the hydraulic system.

There is thus provided a press overload control of the type wherein excess hydraulic pressure generated by the mechanical overload of the press is utilized by the control and wherein the control can distinguish an actual press overload condition from a mere increase in hydraulic pressure caused by non-overload conditions. The present invention is applicable to mechanical presses of the single or double crank type and straight side type and is applicable to press brakes as well.

It is therefore apparent that the present invention accomplishes its intended objects. While a single embodiment of the present invention has been described in detail, this is for the purpose of illustration, not limitation.

I claim:

1. In a mechanical press having frame means including a bed, a reciprocable slide supported by said frame means for movement toward and away from said bed, drive means for reciprocating said slide, and hydraulic means operatively associated with said slide for developing hydraulic pressure proportional to pressing force, the improvement comprising:
   (a) transducer means having an input operatively connected to said hydraulic means for providing an electrical output signal having a magnitude proportional to said hydraulic pressure and a rate of change proportional to the change in magnitude of said hydraulic pressure;
   (b) signal processing circuit means having an input connected to said transducer means and having an output, said circuit means providing an output signal in response to a predetermined minimum change in the magnitude of the electrical output signal from said transducer means and in response to a predetermined minimum rate of change in the magnitude of the output signal from said transducer means; and
   (c) control means connected to said circuit means and operatively coupled to said press drive means for stopping said press drive means in response to an output signal from said circuit means;
   (d) whereby when the output signal from said transducer means changes suddenly due to an actual overload on said press said circuit means responds to cause stopping of said press drive means and whereby said circuit means does not respond to a relatively slower change in the output signal from said transducer means resulting from a slow change in hydraulic pressure during non-overload conditions.

2. Apparatus according to claim 1, wherein said circuit means includes:
   (a) means responsive to a predetermined minimum change in the magnitude of the output signal from said transducer means; and
   (b) means responsive to a predetermined minimum rate of change in the magnitude of the output signal from said transducer means.

3. Apparatus according to claim 1, wherein said circuit means comprises:
   (a) comparison means having a pair of inputs and an output, said comparison means providing an output signal when the difference between the magnitude of signals applied to said inputs is greater than a predetermined amount;
   (b) means for connecting the output of said transducer means to one of said inputs of said comparison means; and
   (c) timing and reference means connected to the output of said transducer means and to the other input of said comparison means, said timing and reference means providing a signal having a fixed magnitude component serving as a reference and having a variable magnitude component functionally related to the rate of change in magnitude of said transducer output signal.

4. Apparatus according to claim 3, wherein said comparison means comprises a differential amplifier.

5. Apparatus according to claim 3, wherein said timing and reference means comprises:
   (a) a first network connected to the output of said transducer and having a time constant;
   (b) a second network connected to a source of direct voltage and establishing a portion thereof as a reference voltage;
   (c) means for combining the outputs of said first and second networks and applying the combination to said other input of said comparison means.

6. Apparatus according to claim 3, wherein said timing and reference means comprises:
   (a) an RC network connected to the output of said transducer means;
   (b) a voltage divider network connected to a source of direct voltage;
   (c) an amplifier having inputs connected to said RC network and to said voltage divider network and having an output coupled to the other input of said comparison means.

7. Apparatus according to claim 1, wherein said control means comprises a relay having a winding adapted to be energized by said output signal of said circuit means and having a pair of sets of contacts operated by said winding, one of said sets of contacts being connected in controlling relation to the winding of a solenoid operated valve operatively associated with said hydraulic means and the other of said sets of contacts being connected in controlling relation to a press control run circuit operatively associated with said press drive means whereby in response to an output signal from said circuit means said relay contacts are operated to cause said valve to depressurize said hydraulic means and to cause said press control run circuit to stop said press drive means.

8. In a mechanical press having frame means including a bed, a reciprocable slide supported by said frame means for movement toward and away from said bed, drive means for reciprocating said slide, and hydraulic means operatively associated with said slide for developing hydraulic pressure proportional to pressing force, the improvement comprising:
   (a) transducer means having an input operatively connected to said hydraulic means for providing an electrical output signal having a magnitude proportional to said hydraulic pressure and a rate of change proportional to the change in magnitude of said hydraulic pressure;
   (b) signal processing circuit means having an input connected to said transducer means and having an output, said circuit means providing an output signal in response to a predetermined minimum change in the magnitude of said transducer output signal and in response to a predetermined minimum rate of change in the magnitude of said transducer output signal, said circuit means comprising comparison means having a pair of inputs and an output, said comparison means providing an output signal when the difference between the magnitude of signals applied to said inputs is greater than a predetermined amount, means for connecting the output of said transducer means to one of said inputs of said comparison means and timing and reference means connected to the output of said transducer means and to the other input of said comparison means, said timing and reference means providing a signal having a fixed magnitude component serving as a reference and having a variable magnitude component functionally related to the rate of change in magnitude of said transducer output signal; and (c) control means connected to said circuit means and operatively coupled to said press drive means for stopping said press drive means in response to an output signal from said circuit means;

(d) whereby when the output signal from said transducer means changes suddenly due to an actual overload on said press said circuit means responds to cause stopping of said press drive means and whereby said circuit means does not respond to a relatively slower change in the output signal from said transducer means resulting from a slow change in hydraulic pressure during non-overload condition.

9. Apparatus according to claim 8, wherein said timing and reference means comprises:

(a) first network connected to the output of said transducer and having a time constant;

(b) a second network connected to a source of direct voltage and establishing a portion thereof as a reference voltage;

(c) means for combining the outputs of said first and second networks and applying the combination to said other input of said comparison means.

* * * * *